United States Patent
Jo

(10) Patent No.: US 9,165,192 B2
(45) Date of Patent: Oct. 20, 2015

(54) APPARATUS AND METHOD FOR SEPARATING FOREGROUND FROM BACKGROUND

(75) Inventor: Young-gwan Jo, Changwon (KR)

(73) Assignee: Hanwha Techwin Co., Ltd., Changwon (KR)

(*) Notice: Subject to any disclaimer, the term of this patent is extended or adjusted under 35 U.S.C. 154(b) by 773 days.

(21) Appl. No.: 13/206,147

(22) Filed: Aug. 9, 2011

(65) Prior Publication Data

US 2012/0033073 A1    Feb. 9, 2012

(30) Foreign Application Priority Data

Aug. 9, 2010    (KR) .................. 10-2010-0076638

(51) Int. Cl.
*H04N 7/18*  (2006.01)
*G06K 9/48*  (2006.01)
*G06K 9/00*  (2006.01)
*G06T 7/00*  (2006.01)

(52) U.S. Cl.
CPC .......... *G06K 9/00771* (2013.01); *G06T 7/0083* (2013.01); *G06T 2207/20144* (2013.01); *G06T 2207/30232* (2013.01)

(58) Field of Classification Search
CPC ............. G06K 9/00771; G06T 2207/20144; G06T 2207/30232; G06T 7/0083
See application file for complete search history.

(56) References Cited

U.S. PATENT DOCUMENTS

| | | | |
|---|---|---|---|
| 7,440,615 B2 | 10/2008 | Gong et al. | |
| 2007/0127774 A1* | 6/2007 | Zhang et al. | 382/103 |
| 2008/0187219 A1 | 8/2008 | Chen et al. | |
| 2009/0154807 A1 | 6/2009 | Rossato et al. | |
| 2009/0290809 A1* | 11/2009 | Yamada | 382/266 |

FOREIGN PATENT DOCUMENTS

| | | |
|---|---|---|
| KR | 10-0604223 B1 | 7/2006 |
| KR | 10-2009-0015456 A | 2/2009 |

* cited by examiner

*Primary Examiner* — Andy Rao
*Assistant Examiner* — Tyler Edwards
(74) *Attorney, Agent, or Firm* — Sughrue Mion, PLLC

(57) ABSTRACT

Provided are apparatuses and methods for separating an image into a foreground and a background. The apparatus includes: an edge image generating unit which generates an edge image for an original image, wherein the original image includes the background and the foreground; a background edge model renewing unit which renews a background edge model based on the generated edge image; and a foreground edge extracting unit which generates a foreground edge image based on the generated edge image and the renewed background edge model.

13 Claims, 7 Drawing Sheets

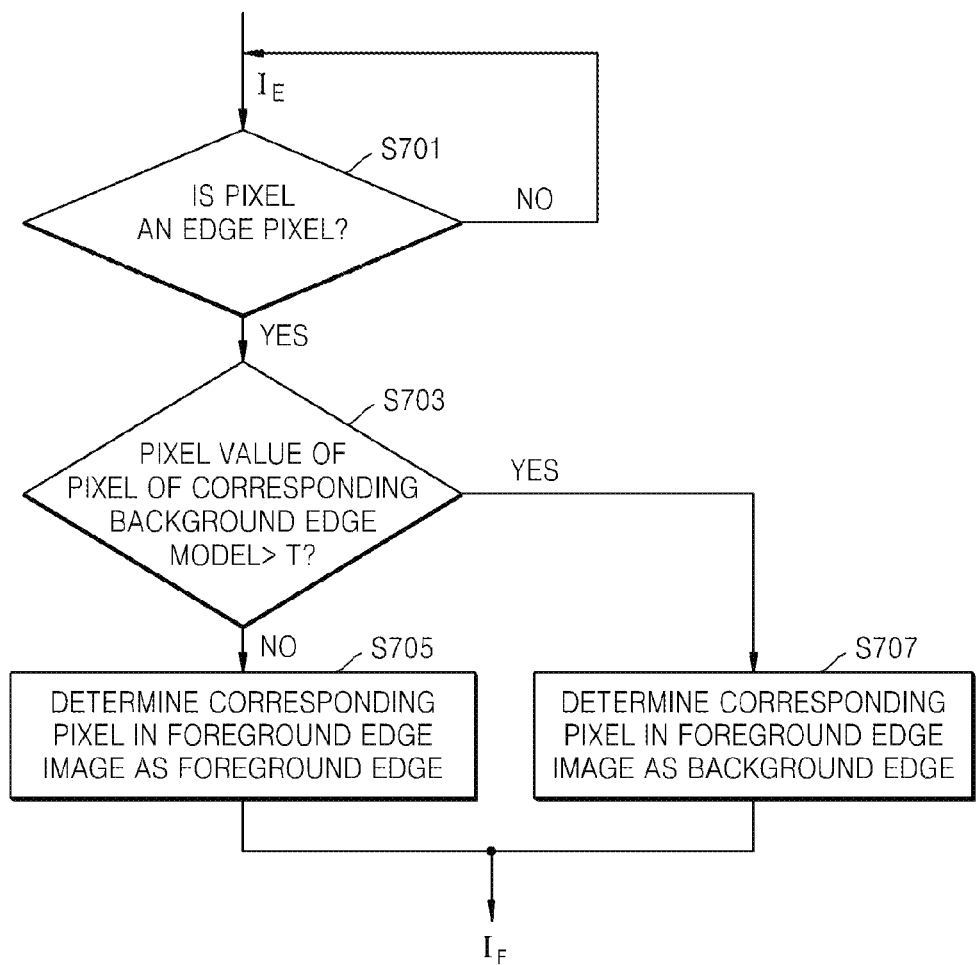

APPARATUS AND METHOD FOR SEPARATING FOREGROUND FROM BACKGROUND

CROSS-REFERENCE TO RELATED PATENT APPLICATION

This application claims priority from Korean Patent Application No. 10-2010-0076638, filed on Aug. 9, 2010, in the Korean Intellectual Property Office, the disclosure of which is incorporated herein by reference in its entirety.

BACKGROUND

1. Field

Apparatuses and methods consistent with exemplary embodiments relate to image processing, and more particularly, to an apparatus and method for separating an image into foreground and background.

2. Description of the Related Art

Currently, while interest in and desire for security increases, image monitoring systems that is historically used in application-specific areas, such as military and police stations are becoming more commercialized and are gradually being supplied to non-governmental corporations and households. Due to the expanding sizes of areas being monitored, there has been an increase in personnel cost for providing additional monitoring manpower; and according to data from psychological studies, when tasked with monitoring such expanded-sized areas, it has also become more difficult for said manpower to provide the proper amount of attention in any given situation. Therefore, the demand for automation in intrusion detection has increased.

In an automated intrusion detection system, one of the main functions of an intelligent monitoring system is extracting a foreground area from an input image. People or vehicles, which are the main interesting objects, correspond to an interesting foreground of a monitoring system. However, people or vehicles generally move and thus a moving part and a non-moving part are separated from each other in an image so that foreground, that is, people or vehicles, are extracted.

In general methods of extracting foreground from an image, color information (grey tone information) of the image is used. A general method of separating foreground/background, which is based on a color value, is sensitive to a change in lighting. Thus, a shadow part is detected as foreground, as illustrated in FIG. 1B, with respect to an original image of FIG. 1A. However, in the general method of separating foreground/background based on a color value, when a still object in an original image of FIG. 2A moves, as in FIG. 2B, an area in which a object was in the still state (i.e., in FIG. 2A) is also detected as part of a foreground area, as illustrated in FIG. 2C. Thus, such general methods are limited in their effectiveness.

SUMMARY

Exemplary embodiments provide an apparatus and method for accurately separating an image into foreground and background in real-time.

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided an apparatus, the apparatus including: an edge image generating unit which generates an edge image for an original image, wherein the original image includes the background and the foreground; a background edge model renewing unit which renews a background edge model based on the generated edge image; and a foreground edge extracting unit which generates a foreground edge image based on the generated edge image and the renewed background edge model.

If a pixel is an edge pixel of the edge image, the background edge model renewing unit may increase a pixel value of a corresponding pixel of the background edge model by a first predetermined value, and if the pixel is a non-edge pixel of the edge image, the background edge model renewing unit may decrease the pixel value of the corresponding pixel of the background edge model by a second predetermined value.

The pixel value may be between a maximum value and a minimum value.

If a pixel of the background edge model corresponding to an edge pixel of the edge image has a pixel value larger than a first threshold value, the foreground edge extracting unit may determine the pixel as being from a background edge, and if the pixel value of the pixel is smaller than the first threshold value the foreground edge extracting unit may determine the pixel as being from a foreground edge.

The apparatus may further include a foreground edge correction unit which deletes a foreground edge having a length shorter than a second threshold value.

The edge image may be a canny edge image.

The apparatus may further include an initial background edge model generating unit which generates an initialized background edge model.

According to an aspect of another exemplary embodiment, there is provided a method of separating an image into a foreground and a background, the method including: generating an edge image for an original image including the background and the foreground; renewing a background edge model based on the generated edge image; and generating a foreground edge image based on the generated edge image and the renewed background edge model.

The renewing of the background edge model may include increasing, by a first predetermined value, a pixel value of a pixel of the background edge model if the pixel is an edge pixel of the edge image, and decreasing, by a second predetermined value, the pixel value of the pixel if the pixel is a non-edge pixel of the edge image.

The generating of the foreground edge image may include determining whether a pixel of the background edge model corresponding to an edge pixel of the edge image has a pixel value larger than a first threshold value, and if the pixel value is larger than the first threshold value, the pixel is determined as being from a background edge and if the pixel value is smaller than the first threshold value, the pixel is determined as being from a foreground edge.

The method may further include deleting a foreground edge having a length shorter than a second threshold value.

The method may further include generating an initialized background edge model before generating the edge image.

According to an aspect of another exemplary embodiment, there is provided an intelligent monitoring system which may include: an image input unit which receives an image corresponding to a surveillance area; an image analyzing unit which processes the image received by the image input unit and senses an event occurring within the surveillance area; a storage unit which stores information about the surveillance area based on sensing of the event by the image analyzing unit; and a display unit which displays a surveillance image based on the information stored in the storage unit, wherein the image analyzing unit processes the image received by the image input unit by generating an edge image including a background and a foreground, renewing a background edge model based on the generated edge image, and generating a foreground edge image based on the generated edge image and the renewed background edge model, and wherein the image analyzing unit senses the event occurring within the surveillance area based on the generated foreground edge image.

BRIEF DESCRIPTION OF THE DRAWINGS

The above and other features will become more apparent by describing in detail exemplary embodiments with reference to the attached drawings in which:

FIG. 7 is a flowchart illustrating a method of separating an image into foreground and background, according to an exemplary embodiment

DETAILED DESCRIPTION

Figure 1A:
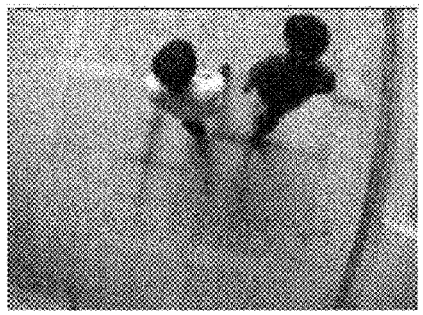
FIGS. 1A and 1B illustrate foreground areas detected according to a general method of separating foreground and background.
Figure 1B:
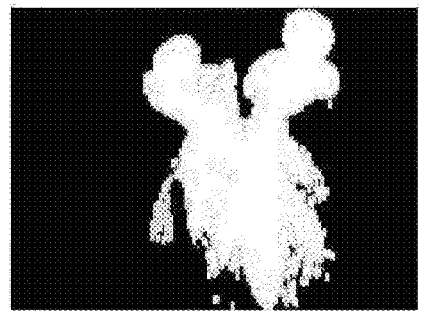
Figure 2A:
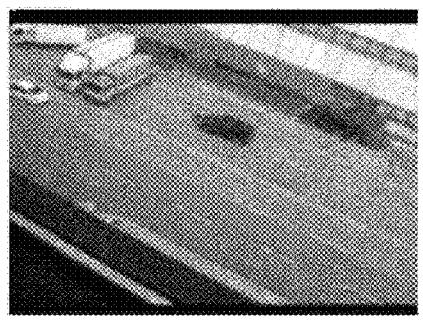
FIGS. 2A, 2B and 2C also illustrate foreground areas detected according to a general method of separating foreground and background.
Figure 2B:
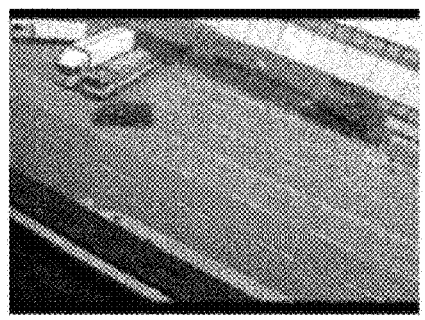
Figure 2C:

Hereinafter, one or more exemplary embodiments will be described in detail with reference to the accompanying drawings. In the drawings, like reference numerals denote like elements. In the description, the detailed descriptions of well-known technologies and structures may be omitted so as not to hinder the understanding.

In general methods of extracting moving objects by using image color information (including grey tone information), a color change above a specific value occurs in moving objects, that is, foreground, compared with non-moving background, and it is assumed that the time for representing background is longer than the time for representing foreground in each pixel. In this regard, a background model is formed by statistically representing a color change according to a time change with respect to each pixel of an image. When a difference between a color value of each pixel of an input image and the previously formed background model is great, it is classified as a foreground pixel; otherwise, it is classified as a background pixel so that the input image is separated into foreground and background.

However, in the above methods, it is difficult to model various color values of each pixel. A color value of pixel in background area is significantly changed according to a change in lighting and the pixel may be determined as foreground pixel. For example, when an image suddenly becomes dark by a cloud rapidly passing, the entire image may be determined as foreground. As another example, when a color is changed by a shadow generated by a moving object, a shadow area may be determined as a foreground area. Also, when foreground remained for long period of time at the same location disappear, a foreground afterimage remains. For example, when foreground remains for long period of time at the same location, the foreground is changed to background after a predetermined time. Then, when foreground moves, background hidden by the foreground may be detected as foreground.

In an exemplary embodiment, edge information is used, instead of color information, to generate an edge image and a background edge model, and a foreground edge and a background edge are determined based on the edge image and the background edge model, thereby detecting foreground. Accordingly, a method of separating an image into foreground and background, which has a strong change in lighting and has no problem of a foreground afterimage, may be provided.

Figure 3:
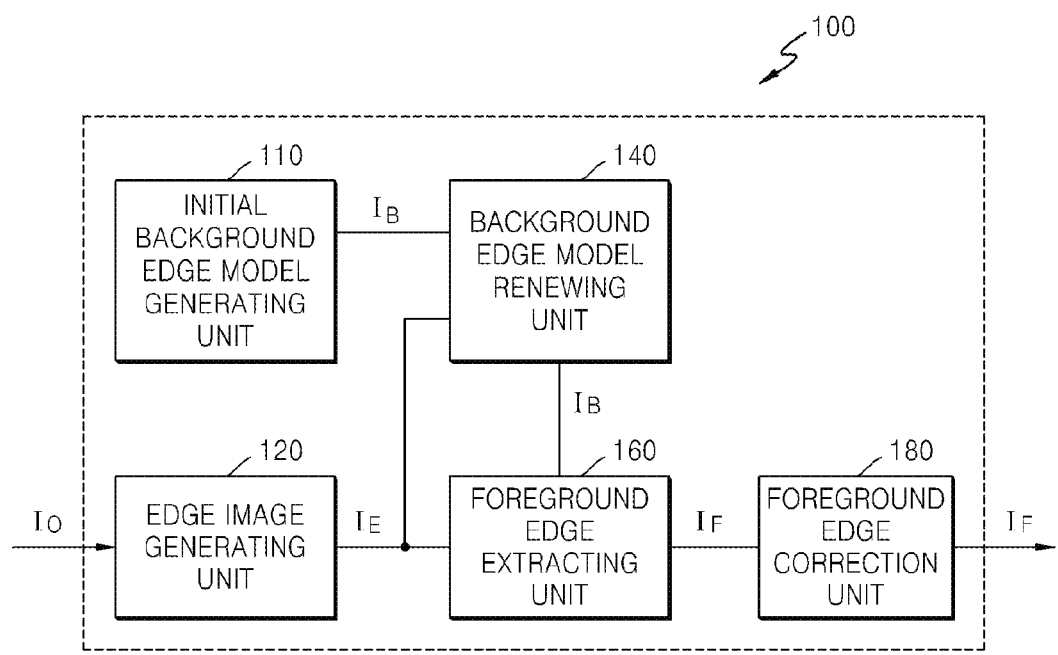
FIG. 3 is a block diagram of an apparatus for separating an image into foreground and background, according to an exemplary embodiment.

FIG. 3 is a block diagram of an apparatus 100 for separating an image into foreground and background, according to an exemplary embodiment.

Referring to FIG. 3, the apparatus 100 for separating an image into foreground and background includes an initial background edge model generating unit 110, an edge image generating unit 120, a background edge model renewing unit 140, a foreground edge extracting unit 160, and a foreground edge correction unit 180. The term "unit" as used herein means a hardware component and/or a software component that is executed by a hardware component such as a processor.

The initial background edge model generating unit 110 generates a background edge model $I_B$, in which a pixel value of each pixel is initialized to 0 in an initialization stage.

The edge image generating unit 120 generates an edge image $I_E$ obtained by binarizing an image in one frame. The edge image $I_E$ includes both a foreground edge of a foreground area and a background edge of a background area. The foreground area includes a moving object (hereinafter referred to as "foreground") and the background area includes an object still for a predetermined time (hereinafter, referred to as "background"). Here, an edge indicates a pixel where a brightness difference between adjacent pixels is large in an image. That is, the edge indicates a boundary of an object included in an image and includes various pieces of important information for detecting a shape and a direction.

The edge image generating unit 120 binarizes each pixel (x,y) of the input image to an edge and a non-edge. A pixel value of the edge is $I_E(x,y)=255$ and a pixel value of a non-edge is $I_E(x,y)=0$. The edge image generating unit 120 may generate the edge image $I_E$ by using, for example, a canny edge detection method, which is well-known. Thus, detailed description thereof is omitted.

The background edge model renewing unit 140 learns the edge image $I_E$ in real-time and renews the background edge model $I_B$ in real-time. The background edge model $I_B$ is renewed based on the pixel value of the edge image $I_E$. The background edge model renewing unit 140 determines whether each pixel of the input edge image $I_E$ is an edge. If a pixel of the current edge image $I_E$ is from an edge, the background edge model renewing unit 140 increases a pixel value of a corresponding pixel in a previous background edge model $I_B$ by a predetermined value. Otherwise, if a pixel of the current edge image $I_E$ is from a non-edge, the background edge model renewing unit 140 decreases a pixel value of a corresponding pixel in a previous background edge model $I_B$ by a predetermined value. Thus, the previous background edge model $I_B$ is renewed to a current background edge model $I_B$. Here, each pixel value of the background edge model $I_B$, $I_B(x,y)$, is limited between a maximum value and minimum value.

For example, if a pixel of the current edge image $I_E$ is from an edge, that is, if the pixel value $I_E(x,y)=255$, a pixel value of a corresponding pixel (same coordinates) in the background edge model $I_B$ increases by 1. That is, $I_B(x,y)$ increases by 1. Otherwise, if a pixel of the edge image $I_E$ is a non-edge, that is, if the pixel value $I_E(x,y)=0$, a pixel value of a corresponding pixel in the background edge model $I_B$ decreases by 1. That is, $I_B(x,y)$ decreases by 1. Here, the maximum value and the minimum value of each pixel value $I_B(x,y)$ may be limited to a threshold value M and 0, respectively.

A still object may move after a predetermined time and a moving object may stop. In this case, the still object regarded as background may be changed to foreground and the moving object regarded as foreground may be changed to background. The background edge model $I_B$ is renewed by learning the edge image $I_E$ of each input frame in real-time so that a change of foreground to background or a change of background to foreground may be reflected.

The background edge model $I_B$ is an image in which foreground and background are uncertain at initial learning. However, when renewing by real-time learning progresses, the background edge model $I_B$ becomes a clear image only displaying a background edge. The clear background edge model $I_B$ becomes the image in which the foreground and the background are uncertain due to the change of foreground into the background or the change of the background into the foreground, and then, becomes a clear image only displaying the background edge as performing the renewal by the real-time learning. If a pixel value of a pixel of the background edge model $I_B$ corresponding to the edge of the edge image $I_E$ is above a threshold value T, the corresponding pixel is determined as from a background edge and a clear background edge model $I_B$, in which a background edge is only displayed, may be generated.

The foreground edge extracting unit 160 generates a foreground edge image $I_F$ based on the edge image $I_E$ and the background edge model $I_B$. If a pixel of the edge image $I_E$ is an edge and a pixel value of a corresponding pixel of the background edge model $I_B$ is greater than a threshold value T, that is, $I_B(x,y)>T$, the foreground edge extracting unit 160 determines the corresponding pixel in the foreground edge image $I_F$ as from a background edge. A pixel value of the pixel determined as the background edge is $I_F(x,y)=0$. Otherwise, if a pixel of the edge image $I_E$ is an edge and a pixel value of a corresponding pixel of the background edge model $I_B$ is smaller than the threshold value T, the foreground edge extracting unit 160 determines the corresponding pixel in the background edge image $I_B$ as being from a foreground edge. A pixel value of the pixel determined as the foreground edge is $I_F(x,y)=255$. Accordingly, the foreground edge image $I_F$ is generated.

If a length of a foreground edge in the foreground edge image $I_F$ is shorter than a threshold value L, the foreground edge correction unit 180 deletes the foreground edge. The length of the foreground edge corresponds to the number of pixels which is successive foreground edges.

In the foreground edge image $I_F$, a broken edge may be generated. The broken edge may be generated when a shake or a noise image is generated when capturing an image, when the entire or a part of a moving object stops more than a predetermined time, when a moving object and a background color are temporarily similar to each other, and when non-regular light is on a background or an object. The broken edge may be a part of a foreground edge and may be noise generated around the foreground. Probabilistically, when a length of an edge is long, the edge may be a foreground edge and when a length of an edge is short, the edge may be noise. Accordingly, if a length of a broken foreground edge is longer than the threshold value L, it is regarded as a foreground edge and thus the foreground edge is maintained. Otherwise, if a length of a broken foreground edge is shorter than the threshold value L, it is regarded as noise and thus the foreground edge is deleted. Accordingly, the foreground edge correction unit 180 may generate the foreground edge image $I_F$ in which a noise is minimized.

FIGS. 4A through 4D illustrate images generated by using the method of separating an image into foreground and background, according to an exemplary embodiment.

Figure 4A:
FIGS. 4A through 4D illustrate example images generated by using the method of separating an image into foreground and background, according to an exemplary embodiment.

FIG. 4A is an original image $I_O$ of one frame input from a camera.

Figure 4B:

FIG. 4B is an edge image $I_E$ generated by detecting an edge according to a canny edge detection method from the original image $I_O$ of FIG. 4A.

Figure 4C:
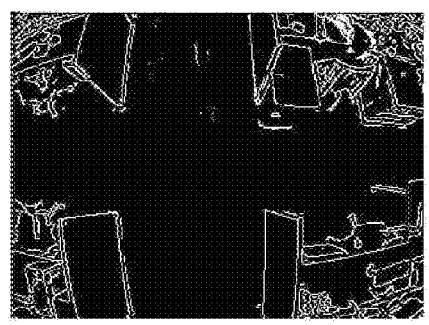

FIG. 4C is a background edge model $I_B$ generated based on the edge image $I_E$ of FIG. 4B. The background edge model $I_B$ is renewed by reflecting edge information detected from the edge image $I_E$ of a current frame to the background edge model $I_B$ of a previous frame. The renewing is performed by increasing a pixel value of a pixel of the background edge model $I_B$ corresponding to a pixel, which is an edge in the edge image $I_E$, by a predetermined value and decreasing a pixel value of a pixel of the background edge model $I_B$ corresponding to a pixel, which is a non-edge in the edge image $I_E$, by a predetermined value.

Figure 4D:
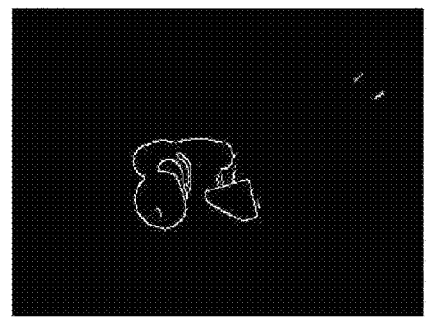

FIG. 4D is a foreground edge image $I_F$ generated based on the edge image $I_E$ and the background edge model $I_B$. When a pixel value of a pixel of the background edge model $I_B$ corresponding to a pixel, which is an edge in the edge image $I_E$, is greater than a predetermined threshold value, a corresponding pixel of the foreground edge image $I_F$ is determined as being from a background edge and thus the pixel value is 0. When a pixel value of a pixel of the background edge model $I_B$ corresponding to a pixel, which is an edge in the edge image $I_E$, is smaller than a predetermined threshold value, a corresponding pixel of the foreground edge image $I_F$ is determined as being from a foreground edge and thus the pixel value is 255. Since the foreground edge and the background edge are classified, the foreground edge image $I_F$ is generated.

Edges having lengths existing around a foreground area of the foreground edge image $I_F$ are noise edges and may be deleted by correction for deleting edges shorter than a predetermined threshold value.

Figure 5:
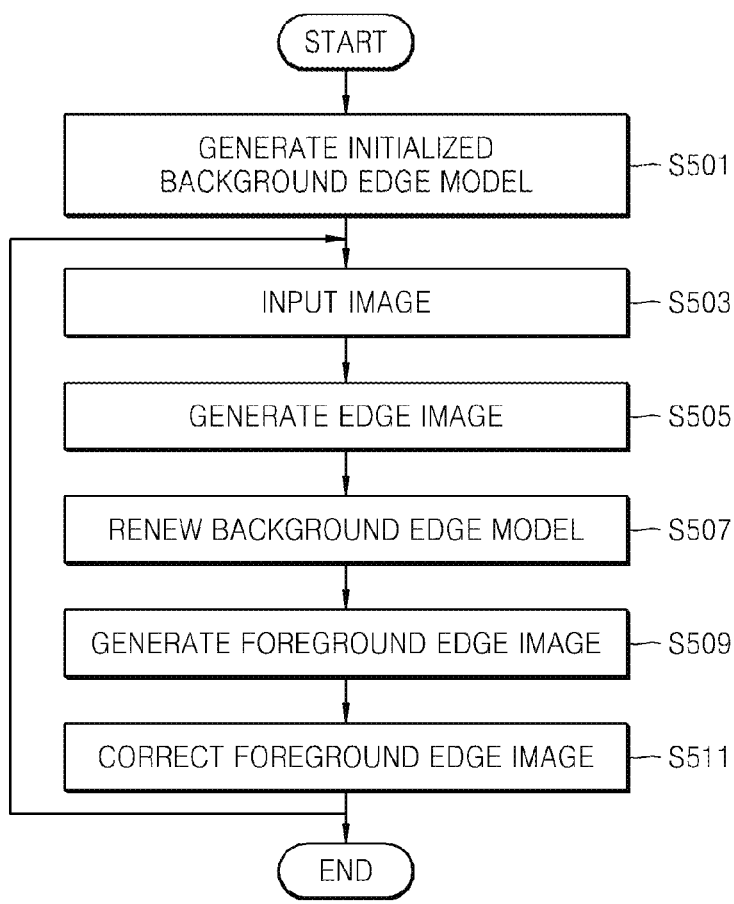
FIG. 5 is a flowchart illustrating a method of separating an image into foreground and background, according to an exemplary embodiment.
Figure 6:
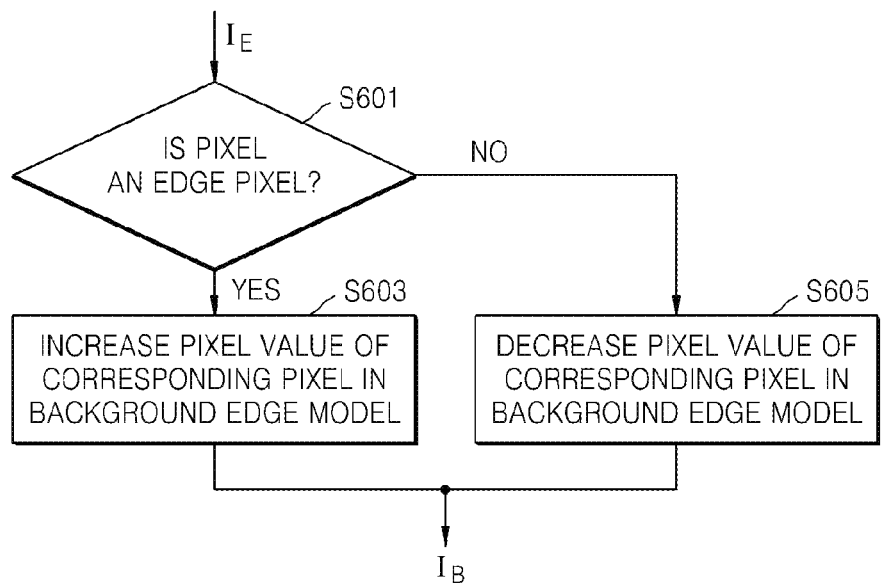
FIG. 6 is a flowchart illustrating a method of separating an image into foreground and background, according to an exemplary embodiment.

FIGS. 5 through 7 are flowcharts illustrating a method of separating an image into foreground and background, according to an exemplary embodiment.

Referring to FIG. 5, an apparatus for separating an image into foreground and background generates an initialized background edge model $I_B$, in which a pixel value of each pixel is initialized to 0 in an initialization stage, in operation S501.

The apparatus receives an original image including background and foreground, in operation S503, and generates an edge image $I_E$ for the original image, in operation S505. The edge image $I_E$ may be a canny edge image.

The apparatus renews the background edge model $I_B$ in real-time by learning the edge image $I_E$ in real-time, in operation S507. More specifically, referring to FIG. 6, the apparatus determines whether a pixel of the edge image $I_E$ is an edge, in operation S601. If the pixel of the edge image $I_E$ is an edge, the apparatus increases a pixel value of a corresponding pixel of the background edge model $I_B$ by a predetermined value, in operation S603. Otherwise, if the pixel of the edge image $I_E$ is not an edge, the apparatus decreases a pixel value of a corresponding pixel of the background edge model $I_B$ by a predetermined value, in operation S605. As such, the background edge model $I_B$ is renewed by an increase and decrease of a pixel value of the background edge model $I_B$ with respect to the edge image $I_E$ of each frame.

The apparatus generates a foreground edge image $I_F$ based on the edge image $I_E$ and the background edge model $I_B$, in operation S509. More specifically, referring to FIG. 7, the apparatus determines whether a pixel of the edge image $I_E$ is an edge, in operation S701. If the pixel of the edge image $I_E$ is an edge, the apparatus compares a pixel value of a pixel of the background edge model $I_B$ with a threshold value T, in operation S703. If the pixel value of the pixel of the corresponding background edge model $I_B$ is smaller than the threshold value T, it is determined as being from a foreground edge, in operation S705. Otherwise, if the pixel value of the pixel of the corresponding background edge model $I_B$ is greater than the threshold value T, it is determined as being from a background edge, in operation S707. Accordingly, the apparatus generates the foreground edge image $I_F$ indicating the foreground edge.

The apparatus deletes an edge that is shorter than a threshold value in the foreground edge image $I_F$ and thus corrects the foreground edge image $I_F$, in operation S511.

FIGS. 8 and 9 are foreground edge images generated by the method of separating an image into foreground and background, according to an exemplary embodiment.

Figure 8A:
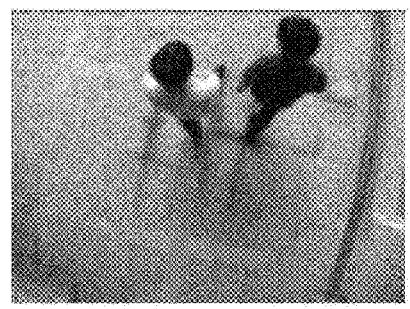
FIGS. 8A and 8B show a foreground edge image generated by the method of separating an image into foreground and background, according to an exemplary embodiment.
Figure 8B:
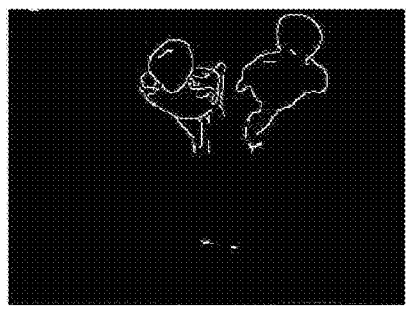

In FIG. 8A, a background color is changed by a shadow of a moving object in an original image. In this case, edge information used in the method of separating an image into foreground and background, according to an exemplary embodiment, is strong for a lighting change and thus is not sensitively changed. Thus, as illustrated in FIG. 8B, a shadow is not detected as foreground.

Figure 9A:
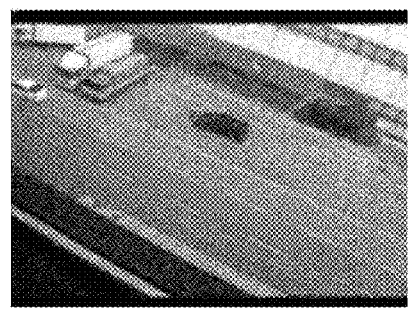
FIGS. 9A, 9B and 9C show another foreground edge image generated by the method of separating an image into foreground and background, according to an exemplary embodiment.
Figure 9B:
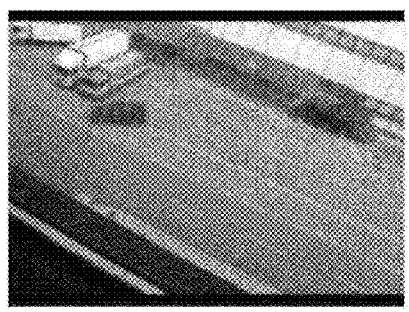
Figure 9C:

A still object in an original image of FIG. 9A is moving in an original image of FIG. 9B. In this case, the edge information used in the method of separating an image into foreground and background according to an exemplary embodiment disappears when an object disappears. Thus, as illustrated in FIG. 9C, a foreground afterimage is not detected.

Figure 10:
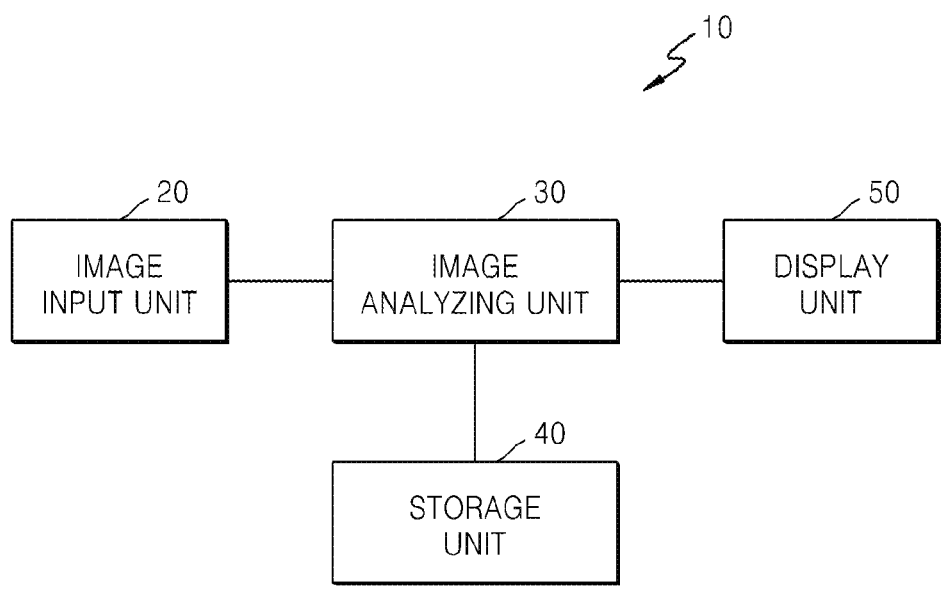
FIG. 10 is a block diagram of an intelligent monitoring system according to an exemplary embodiment.

FIG. 10 is a block diagram of an intelligent monitoring system 10 according to an exemplary embodiment.

Referring to FIG. 10, the intelligent monitoring system 10 may include an image input unit 20, an image analyzing unit 30, a storage unit 40, and a display unit 50.

The intelligent monitoring system 10 processes an image input through a camera installed at a specific location or a moving camera and detects a region of interest and an object. A plurality of intelligent monitoring systems 10 are connected to each other through a wired and/or wireless network and communicate data and signals with each other.

The image input unit 20 receives an image from a plurality of predetermined regions of interest. The image input unit 20 may include a lens, a camera, and a driving device. The lens may have a zoom-in function and/or a zoom-out function. Accordingly, the camera may receive an image in a narrow region or an image in a wide area in detail. The camera is combined with a lens and may receive an image through the lens. The driving device may move the lens and the camera and include a pan/tilting system so that the upper and lower and left and right angles of the regions of interest, to which an image is input, may be changed. The image input unit 20 may be a moving patrol robot that moves a determined path.

The image analyzing unit 30 processes and analyzes an input image and senses an event. In order to sense an event, the image analyzing unit 30 may include the apparatus for separating an image into foreground and background of FIG. 3. The method of separating the image into foreground and background by using the apparatus for separating the image into foreground and background is described above, and thus, detailed descriptions thereof are not provided. The apparatus separates an image into foreground and background by using edge information of an input image. The apparatus generates an edge image from the input image and renews a background edge model based on the edge image. A foreground edge image is generated based on the edge image and the background edge model. The image analyzing unit 30 extracts foregrounds by using the apparatus and then may extract information about object classification for determining an object included in a foreground area, about object division for dividing each object in the foreground area, and object tracking for identifying a moving path of an object in a plurality pieces of images. Also, the image analyzing unit 30 reprocesses such information and thus may generate information desired by a user, for example, intruder detection or an object counting.

The storage unit 40 stores information about a surveillance area according to an image analyzing result and a user, who requires security, uses the information in a surveillance activity. Thus, weakness of security may be easily identified.

The display unit 50 displays a surveillance image. The display unit 50 may provide visible information and/or auditory information to a user and may include a liquid crystal display (LCD) panel, an organic light emitting display (OLED) panel, or an electrophoretic display (EPD) panel. The display unit 50 is in the form of a touch screen so that an input may be received through a user's touch and thus may be operated as a user input interface.

The apparatus and method for separating an image into foreground and background, according to an exemplary embodiment, are strong for a lighting change, do not leave a foreground after image due to a movement of an object, and accurately separate an image into foreground and background.

The device described herein may comprise a processor, a memory for storing program data and executing it, a permanent storage such as a disk drive, a communication port for handling communication with external devices, and user interface devices, including a touch panel, keys, buttons, etc. When software modules or algorithms are involved, these software modules may be stored as program instructions or computer-readable codes executable on the processor on a computer-readable recording medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated in their entirety by reference.

For the purposes of promoting an understanding of the principles of the inventive concept, reference has been made to the exemplary embodiments illustrated in the drawings, and specific language has been used to describe these exemplary embodiments. However, no limitation of the scope of the invention is intended by this specific language, and the invention should be construed to encompass all exemplary embodiments that would normally occur to one of ordinary skill in the art.

The present inventive concept may be described in terms of functional block components and various processing steps. Such functional blocks may be realized by any number of hardware and/or software components configured to perform the specified functions. For example, exemplary embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, exemplary embodiments could employ any number of conventional techniques for electronics configuration, signal processing and/or control, data processing and the like. The words "mechanism", "element", "means", and "configuration" are used broadly and are not limited to mechanical or physical exemplary embodiments, but can include software routines in conjunction with processors, etc.

The particular implementations shown and described herein are illustrative examples, and are not intended to otherwise limit the scope of the inventive concept in any way. For the sake of brevity, conventional electronics, control systems, software development and other functional aspects of the systems may not be described in detail. Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential unless the element is specifically described as "essential" or "critical".

Recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present inventive concept is not limited to the described order of the steps. The use of any and all examples, or exemplary language (e.g., "such as") provided herein, is intended merely to better illuminate the invention and does not pose a limitation on scope unless otherwise claimed. Numerous modifications and adaptations will be readily apparent to those skilled in this art without departing from the spirit and scope of the inventive concept.

While exemplary embodiments have been particularly shown and described hereinabove, it will be understood by those of ordinary skill in the art that various changes in form and details may be made therein without departing from the spirit and scope of the present inventive concept as defined by the following claims.

What is claimed is:

1. An apparatus for separating an image into a foreground and a background, the apparatus comprising:
    an edge image generating unit which generates an edge image of a current image, wherein the current image includes a background and a foreground;
    a background edge model renewing unit which renews a background edge model of a previous image based on the generated edge image of the current image; and
    a foreground edge extracting unit which generates a foreground edge image based on the generated edge image and the renewed background edge model,
    wherein if a pixel is an edge pixel of the edge image of the current image, the background edge model renewing unit increases a pixel value of a corresponding pixel of the background edge model of the previous image by a first predetermined value, and
    wherein if the pixel is a non-edge pixel of the edge image of the current image, the background edge model renewing unit decreases the pixel value of the corresponding pixel of the background edge model of the previous image by a second predetermined value.

2. The apparatus of claim 1, wherein the pixel value of the background edge model is between a maximum value and a minimum value.

3. The apparatus of claim 1, wherein if a pixel of the background edge model corresponding to an edge pixel of the edge image has a pixel value larger than a first threshold value, the foreground edge extracting unit determines the pixel as being from a background edge, and
    wherein if the pixel value of the pixel is smaller than the first threshold value, the foreground edge extracting unit determines the pixel as being from a foreground edge.

4. The apparatus of claim 3, further comprising a foreground edge correction unit which deletes a foreground edge having a length shorter than a second threshold value.

5. The apparatus of claim 1, wherein the edge image is a canny edge image.

6. The apparatus of claim 1, further comprising an initial background edge model generating unit which generates an initialized background edge model.

7. A method of separating an image into a foreground and a background, the method comprising:
    generating an edge image of a current image including the background and the foreground;
    renewing a background edge model of a previous image based on the generated edge image of the current image; and
    generating a foreground edge image based on the generated edge image and the renewed background edge model,
    wherein the renewing of the background edge model of the previous image comprises increasing, by a first predetermined value, a pixel value of a pixel of the background edge model of the previous image if the pixel of the background edge model of the previous image corresponds to an edge pixel of the edge image of the current image, and decreasing, by a second predetermined value, the pixel value of the pixel of the background edge model of the previous image if the pixel of the background edge model of the previous image corresponds to a non-edge pixel of the edge image of the current image.

8. The method of claim 7, wherein the pixel value of the background edge model is between a maximum value and a minimum value.

9. The method of claim 7, wherein the generating of the foreground edge image comprises determining whether a pixel of the background edge model corresponding to an edge pixel of the edge image has a pixel value larger than a first threshold value, and if the pixel value is larger than the first threshold value, the pixel is determined as being from a background edge and if the pixel value is smaller than the first threshold value, the pixel is determined as being from a foreground edge.

10. The method of claim 9, further comprising deleting a foreground edge having a length shorter than a second threshold value.

11. The method of claim 7, wherein the edge image is a canny edge image.

12. The method of claim 7, further comprising generating an initialized background edge model before generating the edge image.

13. An intelligent monitoring system comprising:
   an image input unit which receives a current image corresponding to a surveillance area;
   an image analyzing unit which processes the current image received by the image input unit and senses an event occurring within the surveillance area;
   a storage unit which stores information about the surveillance area based on sensing of the event by the image analyzing unit; and
   a display unit which displays a surveillance image based on the information stored in the storage unit,
   wherein the image analyzing unit processes the current image received by the image input unit by generating an edge image of the current image, the edge image including a background and a foreground, renewing a background edge model of a previous image based on the generated edge image of the current age, and generating a foreground edge image based on the generated edge image and the renewed background edge model,
   wherein the image analyzing unit senses the event occurring within the surveillance area based on the generated foreground edge image, and
   wherein the renewing of the background edge model of the previous image comprises increasing, by a first predetermined value, a pixel value of a pixel of the background edge model of the previous image if the pixel of the background edge model of the previous image corresponds to an edge pixel of the edge image of the current image, and decreasing, by a second predetermined value, the pixel value of the pixel if the pixel of the background edge model of the previous image corresponds to a non-edge pixel of the edge image of the current image.

* * * * *